Aug. 27, 1963  J. VAN LONDERSELE  3,101,791
DRIVE INTERRUPTING APPARATUS FOR GRAIN DRILLS AND THE LIKE
Filed Oct. 2, 1961  2 Sheets-Sheet 2

INVENTOR.
Jean Van Londersele

United States Patent Office 3,101,791
Patented Aug. 27, 1963

3,101,791
DRIVE INTERRUPTING APPARATUS FOR GRAIN DRILLS AND THE LIKE
Jean Van Londersele, Montataire, France, assignor to International Harvester Company, Chicago, Ill., a corporation of New Jersey
Filed Oct. 2, 1961, Ser. No. 142,319
Claims priority, application France Oct. 5, 1960
5 Claims. (Cl. 172—445)

The present invention relates generally to agricultural implements, and more particularly to a device for distributing powdered material, such as seed, fertilizer, and the like.

In the field of distributing pulverized or powdered materials, it has been the general practice to employ devices which have a rotary drive to distribute the material by centrifugal force. Although such devices have served the purpose, they have not proved entirely satisfactory, since they have exhibited a tendency to distribute the materials unevenly at the beginning and end of a field. The general purpose of the present invention is therefore, to provide a distributor of powdered materials with means which allow it to distribute the materials evenly over an entire field. To attain this, the present invention contemplates a unique drive interrupting mechanism, which cooperates with a conventional three-point hitch, to obviate the problem of uneven distribution of powdered materials at the beginning and end of a field.

An object of the present invention is the provision of a machine which will distribute powdered or granulated materials, when in a lowered or working position, and which will not distribute said materials when in a raised or non-working position.

Another object is to provide a distributing machine having a rotary driving mechanism with means which will interrupt said driving mechanism, when the machine is raised, thereby rendering the machine non-working.

A further object of the invention is the provision of a drive interrupting mechanism which is actuated by a conventional three-point hitch.

Other objects and advantages of the invention will hereinafter become more fully apparent from the following description of the annexed drawings, which illustrates a preferred embodiment, and wherein.

Figure 1:
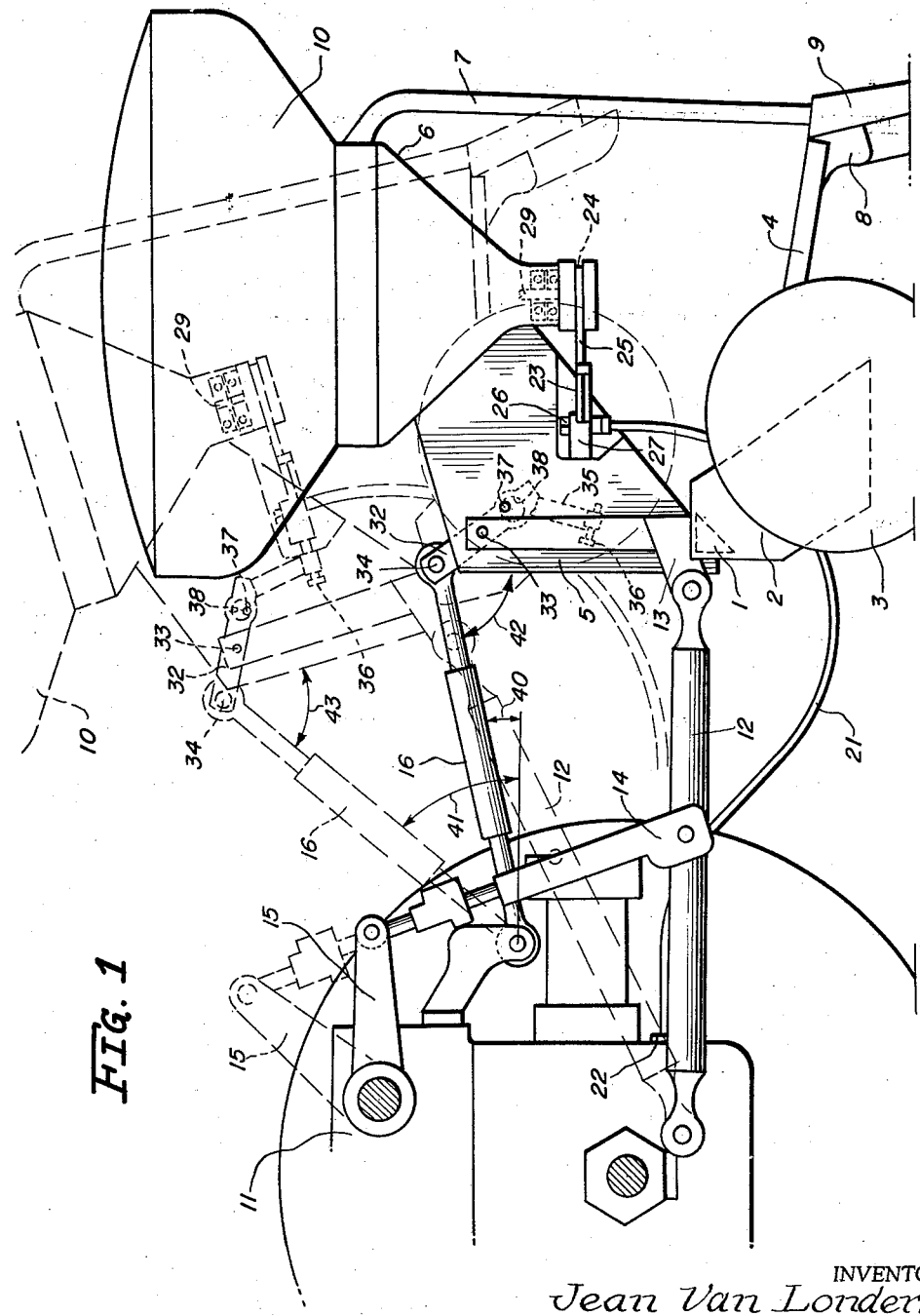
FIGURE 1 is a side elevational view of a preferred embodiment of the invention secured to a tractor, showing the distributing mechanism in both the working and inoperative positions.

Referring now specifically to FIGURE 1, the machine is shown with a transversely extending frame structure 1. A pair of depending arm members 2 are secured to the ends of frame structure 1, and have transport wheels 3 mounted thereon. A plurality of longitudinally extending drag links 4, only one of which is shown, are mounted on frame structure 1, at transversely spaced points thereacross. A generally vertically extending bracket 5 is mounted on the central portion of frame structure 1, and has the distributing mechanism 6 of the distributing machine secured thereto. The distributing mechanism is of the type having a conical rotating element, which distributes the powdered or granulated material by centrifugal force through openings spaced around the top of a distributing mechanism, and forms no part of the present invention. A plurality of flexible tubes 7 are secured to the top of the distributing mechanism 6, and carry the powdered or granulated material into the ground. A furrow opener 8 is provided at the end of each drag link 4 to open a furrow for reception of the powdered material. A boot member 9 may be provided in conjunction with each furrow opener 8 to guide the powdered material into the furrow. A hopper 10 is mounted on the top of grain distributor 6, and provides a continuous supply of material thereto. The distributing machine shown in FIGURE 1 is connected to a tractor 11 by a conventional three-point hitch. The hitch structure comprises a pair of longitudinally extending draft links 12, only one of which is shown, pinned at one end to tractor 11 and pivotally secured at the other end to arm 13, which is in turn connected to frame structure 1. An intermediate link 14 is connected to the central portion of draft links 12, and extends generally vertically upward therefrom, where it is pivotally secured to arm 15. Arm 15 is secured to a transversely extending rockshaft, which swings arm 15, and thereby the entire hitch structure, in a generally vertically upward and downward direction. The hitch structure further comprises a generally longitudinally extending push bar 16, pivotally secured at one end to tractor 11, and at the other end to the drive interrupting means of the distributing machine.

Figure 3:
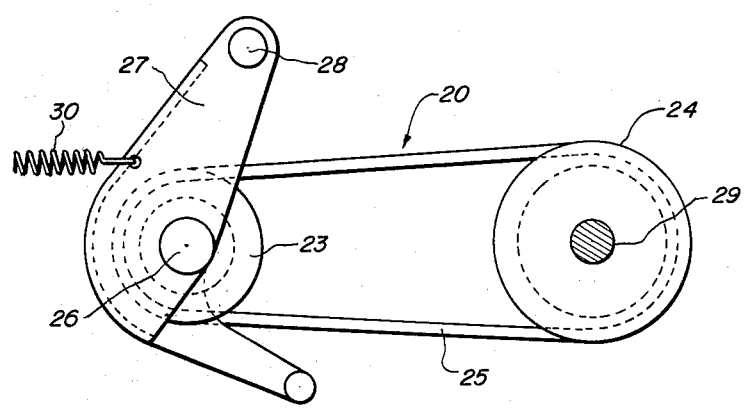
FIGURE 3 is a bottom view of the drive transmission.

Referring now to FIGURE 3, reference numeral 20 indicates generally a rotary drive transmission for distributing mechanism 6. Transmission 20 is actuated by a flexible cable drive means 21, connected to tractor power take-off 22. Transmission 20 consists essentially of two spaced-apart pulleys 23 and 24, interconnected by an endless belt 25. One end of flexible cable drive means 21 is connected to spindle 26 of pulley 23, for rotation thereof. Spindle 26 is rotatably mounted in a pulley shell 27, which is in turn pivotally secured, as by pin 28, to bracket member 5. Spindle 29 of pulley 24 is rotatably engageable with distributing mechanism 6 for driving thereof. It will be readily understood that when pulley shell member 27 is pivoted around pin 28, pulley 23 will be moved closer to pulley 24, whereby a slack is created in endless belt 25 discontinuing the rotation of spindle 29. A resilient return means 30, such as a spring or the like, is secured to pulley shell 27 for returning it to its unswung position so as to reset pulley 23 into its driving relation with pulley 24.

Figure 2:
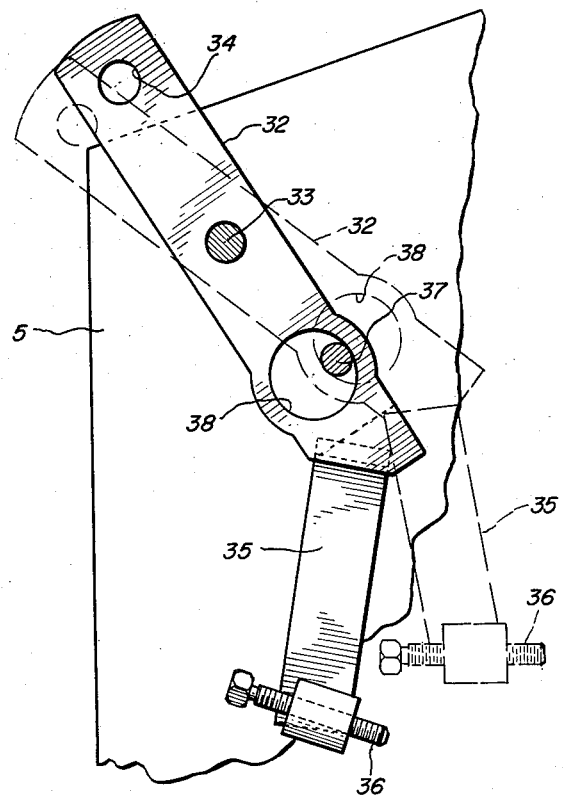
FIGURE 2 is a detail view of the drive interrupting mechanism.

The drive interrupting means which actuate pulley shell 27 are shown in detail in FIGURE 2. The drive interrupting means comprises a lever 32 rockably mounted on bracket 5 by a transversely extending pin member 33, or the like. Lever 32 is further articulated at 34 to one end of push bar 16 of the hitch structure. A depending leg member 35 is fixedly secured to the other end of lever 32, and has mounted thereon an adjustable abutment member 36. A movement limiting member 37, such as a transversely extending pin, is secured to bracket member 5, and cooperates with a circular aperture 38 provided at the end of lever 32 adjacent leg member 35, to limit the rocking movement of lever 32.

The operation of the device will be best understood from an examination of FIGURE 1. In order to disengage the distributing mechanism 6, the tractor driver merely needs to lift the entire distributing machine from the ground by the swinging of arm 15, which will automatically disengage the distributing mechanism drive as will hereinafter become more apparent. As the machine is lifted, the tilt of the push bar 16 varies in relation to the horizontal as well as in relation to the frame of the machine. Thus the angle 40 made by the push bar with the horizontal, when the machine is in the lowered or working position, increases as shown at 41, when the machine is lifted, while the angle 42 made by the push bar with the frame of the machine decreases as shown at 43. As push bar 16 is elevated, lever 32 will rock about pin 33 in a counterclockwise direction, as viewed in FIGURE 1, due to articulated connection 34. The amount of rocking movement of lever 32 is restricted by the cooperation of member 37 with aperture 38. It will be obvious that as lever 32 rocks, abutment member 36 will come to bear upon pulley shell 27, causing a pressure to be exerted thereon, moving the pulley shell and its associated pulley 23 closer to pulley 24. This movement results in the slackening of belt 25, which in turn causes the disengagement of the power means to distributing mechanism 6. Return means 19 will reset pulley 23 into its driving position automatically, when the machine is again repositioned on its wheels. With the machine standing on its wheels the bar 16 is under compression, and there is no danger of the drive interrupting mechanism being inadvertently operated.

It should be understood, of course, that the foregoing disclosure relates to only a preferred embodiment of the invention, and that numerous modifications and alterations may be made therein without departing from the spirit and scope of the invention as set forth in the appended claims.

What is claimed is:

1. In an implement having a driven part and adapted to be mounted on a tractor and transported thereby, hitch means carried by the tractor comprising lower draft links connected to the implement and an upper link vertically spaced above said draft links, an articulated lever pivotally connected at one end to said upper link and pivotally connected to the implement at a location spaced from the connection of the lever to said upper link and vertically spaced above said draft link implement connections, said lever being swingable upon vertical movement of said links and the implement therewith to a raised position, said lever having a part thereon engageable with said driven part to interrupt the operation thereof, said engageable part of the lever being movable out of operative engagement with said driven part upon lowering of said links and the implement therewith to its initial lowered position.

2. The invention according to claim 1 wherein the driven part consists of a pair of rotatable members whose center distance establish a driver-driven relationship to each other, the driven member having its center located on the implement for the operation thereof, the driver member having its center carried by an articulated link pivotally connected at one end to the implement at a location spaced from the center of the driver member, said articulated link being swingable upon engagement with said engageable part of the lever to move the driver member out of operative engagement with the driven member by reducing the center distance of the rotatable members to each other.

3. The invention according to claim 1 wherein the driven part consists of a pair of pulleys in spaced apart relationship having a continuous belt disposed therebetween, one pulley being mounted to the implement for the operation thereof, a linkage pivotally mounted on the implement and having the other pulley secured thereto, said linkage being swingable upon engagement with said lever part so as to move said other pulley out of operative engagement with said belt, and tension means associated with said linkage for automatically returning said other pulley into operative engagement with said belt upon lowering of said implement.

4. The invention according to claim 1 wherein the articulated lever consists of an upper and lower linkage, said upper linkage having one end connected to the upper link of the tractor hitch means and being pivotally mounted to the implement at a location spaced therefrom, a movement restricting member mounted on the implement, the other end of said upper linkage being provided with means cooperating with said motion restricting member to limit the rocking movement of the lever, said lower linkage having one end connected to the upper linkage, the other end of said lower linkage being provided with adjustable abutment means engageable with the driven part of the implement.

5. The combination with a tractor having hitch means including a pair of lower draft links and an upper link pivoted to the tractor for vertical swinging, of an implement having a driven part thereon and pivotally connected to the lower of said links for vertical swinging movement therewith between lifted and lowered positions, means connecting the upper of said links to the implement comprising an articulated lever rockably mounted at its intermediate portion on said implement, one end of said lever being pivotally secured to said upper hitch link, the other end of said lever having a depending leg member associated therewith, said lever being rockable in response to the vertical movement of said upper link, and abutment means secured to said leg member and engageable with said driven part upon lifting of said implement to interrupt the drive of said driven part.

References Cited in the file of this patent

UNITED STATES PATENTS

| | | |
|---|---|---|
| 2,547,143 | Speicher | Aug. 3, 1951 |
| 2,674,279 | Wilson | Apr. 6, 1954 |
| 2,706,068 | Ward | Apr. 12, 1955 |
| 2,755,002 | Gustafson | July 17, 1956 |
| 2,874,878 | Stokland | Feb. 24, 1959 |
| 2,901,257 | Teagle | Aug. 25, 1959 |

FOREIGN PATENTS

| | | |
|---|---|---|
| 1,218,884 | France | Dec. 21, 1959 |